United States Patent [19]

Moore

[11] 4,287,020

[45] Sep. 1, 1981

[54] METHOD OF PREPARATION OF AN ASBESTOS PRODUCT

[76] Inventor: Irving F. Moore, P.O. Box 805, Coalinga, Calif. 93210

[21] Appl. No.: 98,893

[22] Filed: Nov. 29, 1979

[51] Int. Cl.³ .............................................. C03B 37/00
[52] U.S. Cl. ........................................ 162/3; 162/13; 162/154; 162/155; 428/251; 428/402; 428/403; 428/407; 428/443
[58] Field of Search .............. 428/251, 402, 403, 443, 428/407; 162/3, 13, 154, 155

[56] References Cited

U.S. PATENT DOCUMENTS

| | | | |
|---|---|---|---|
| 3,197,529 | 7/1965 | Greiner | 428/443 |
| 3,870,546 | 3/1975 | Gelsomino | 418/443 |
| 3,955,030 | 5/1976 | Winters | 428/443 |
| 3,965,284 | 6/1976 | Xanthos et al. | 162/3 |
| 4,056,655 | 11/1977 | Faille et al. | 428/443 |
| 4,091,161 | 5/1978 | Deaverchere | 428/402 |
| 4,184,906 | 1/1980 | Young | 428/443 |
| 4,226,672 | 10/1980 | Alsolon et al. | 162/3 |

*Primary Examiner*—James J. Bell
*Attorney, Agent, or Firm*—Larson and Taylor

[57] ABSTRACT

A flexible mat of randomly-oriented, interwoven chyrsotile asbestos fibers, having the appearance of a flake when flattened and spread out to "open" the fibers without separating the individual fibers and without significantly reducing their natural length, have been found to provide a reinforcing agent of extraordinary strength.

16 Claims, No Drawings

METHOD OF PREPARATION OF AN ASBESTOS PRODUCT

BACKGROUND OF THE INVENTION

1. Field of the Invention

This invention relates to a novel asbestos product, its method of manufacture and its use as a reinforcing agent.

2. Brief Description of Prior Art

Asbestos has been on the commercial markets of the United States for over 100 years. Initially the fibers were simply a curiosity. As its fire retardant capabilities became more widely recognized, it became a flame safety ingredient in fireproof curtains, walls, clothing and shingles. However, the commodity really came into its own with (1) the widespread electrification of industry and (2) the growth of the American automotive companies. In the former, the superior electrical insulation properties of low iron chrysotile asbestos were recognized; the latter acknowledged the ability of the fibers to impart some of their inherent strength to friction components—i.e. brakes—while under thermal stress. Still later, the growth aspects of the asbestos industry focused on the utilization of fiber in connection with plastics. At present, over 800,000 tons of asbestos fiber is consumed annually in the United States in over 3,000 applications. In most of these applications, asbestos is a key ingredient and few substitutes are currently available.

The word asbestos is a broad generic term that has been accepted and applied to a number of fibrous mineral silicates found in nature. As a group, they are incombustible and can be separated by mechanical means into fibers of various lengths and thicknesses, but have differing chemical compositions and other properties. Generally speaking, six varieties of asbestos are recognized: (1) chrysotile, the finely fibrous form of serpentine and five others all of the amphibole group, (2) anthophyllite, (3) crocidolite, (4) tremolite, (5) amosite, and (6) actinolite. Of the foregoing, chrysotile constitutes about 94% of the current world production of asbestos and this percentage is increasing.

The common property of the asbestos minerals is that they have physical characteristics similar to those of organic fibers yet they are both non-combustible and noncorrosive. If sufficiently long to be spun, the fibers of chrysotile and crocidolite are woven into fabrics with wide application. Among the advantages of chrysotile, which set it apart from the amphiboles, are worldwide availability, mechanical strength, flexibility, positive surface charge, low iron content, softness, a low refractive index and general resistance to the elements of the air.

Traditionally, the uses of asbestos are largely determined by the characteristics, particularly length, of a given fiber. Also by tradition, the Quebec Grading System is the most widely followed system of valuing fiber. Other producing areas and countries use differing terminology for the various grades, but this amounts to little more than paraphrasing the Quebec system. All uses of asbestos are as processed fiber. The processed chyrsotile fibers are placed into the following groupings, which are based upon length of fiber.

Groups 1, 2, and 3—These groups are composed of the longest fibers; the major end use products include textiles, clothing, theatre curtains, different types of packings, in the manufacture of fire-proof textile products, woven brake linings, clutch facings, electrical insulation materials, and high pressure and marine insulation.

Group 4—Its major use is in asbestos cement pipe, used in the transportation of water, as in municipal water works, irrigation and conservation projects.

Group 5—This group is used in asbestos cement sheets, flat corrugated sheets, low pressure asbestos cement pipes, and molded products; it is also used in some paper products such as pipe insulation, wrappings, and other products, including brake linings and gaskets.

Group 6—The main consumption for this group is the asbestos cement products mix, gaskets, brake linings, vinyl sheet backings and millboard.

Group 7—The group is used in molded brake linings and clutch facings, as a filler in vinyl and asphalt floor tile, in asphalt compounds, joint and insulation cements, roof coatings, plastics and caulking compounds.

If such a generalization is possible, the "typical Quebec type" asbestos occurs as cross fiber veins ranging in width from microscopic dimensions to more than 6 inches in which the fibers lie approximately perpendicular or somewhat inclined to the walls. In place the "typical Quebec type" chrysotile appears pale green to greenish yellow in color. It is only when separated that the fibers form the fluffy white mass most of us associate with asbestos.

Generally the ore bodies in Quebec contain 5 to 7 percent fiber, although at some deposits, rock that contains a little as 1.5 or 2 percent is worked if substantial fiber length is present. The veins are irregularly distributed in the deposit so that normally about 20 percent or more of the rock mined is barren and discarded as waste. Consequently, the mill feed, at most mines, contains about 7 to 8 percent fiber.

In general, the commercial value of a "typical Quebec type" asbestos deposit in massive serpentine is determined by balancing a number of factors including the fiber content of the rock, proportions of the various fiber lengths and volume of fiber bearing rock. The fiber content of the rock, which depends on both the width and spacing of the veins seldom exceeds 5 percent. The bulk of the fiber in most of the world's deposits is less than $\frac{1}{4}"$ in length and thus is of relatively low value. This ore must contain sufficient values to cover mining costs (stripping, drilling, blasting and excavation) and milling via the complicated procedure necessary to extract a clean fiber from the serpentine. There are many "typical Quebec type" asbestos deposits in the world but few measure up to the stringent requirements of an economic ore body.

There is also known to exist in at least two parts of the world, i.e. the Coalinga area of California and the Stragari mine in Yugoslavia, asbestos ore bodies which in physical appearance are markedly unlike almost any other asbestos ore in the world. The veining that characterizes "typical Quebec type" chrysotile asbestos is absent from the serpentine host and instead, the ore consists of friable masses of matted chrysotile flakes surrounding fragments of rock. The flexible flakes have been shown to be made of short fibered asbestos and petrographic x-ray and chemical analyses have shown the fibers to be chrysotile and identical to Canadian chrysotile. The main difference lies in the fact that the fibers, rather than occuring in vein form, are randomly oriented and matted into flakes.

Regardless of its nature or source, before the mined chrysotile asbestos can be used as a reinforcing agent, it is conventionally subjected to a heavy pretreatment plus a standard milling operation whereby the ore is successively dried, separated into individual fibers of a specific length by screening, opened by disc grinders and then packaged for marketing. Unfortunately, asbestos fibers separated from the deposits in the Coalinga area of California or the Stragari mine in Yugoslavia hereinafter referred to jointly as Coalinga type asbestos fiber are too short for many industrial and emergency uses. Short asbestos fibers are characterized by insufficient strength.

OBJECTS OF THE INVENTION

Accordingly, it is an object of the invention to provide a short fiber-containing asbestos product which exhibits the strength and characteristics of longer high grade asbestos fibers under the Quebec Grading System.

Another object of the invention is to provide a method of preparing an asbestos product having greater strength than is possible by conventional processing of the same starting raw chrysotile material.

A further object of the present invention is to provide asbestos cement compositions having unexpectedly higher moduli of rupture than are exhibited by using conventionally derived asbestos fibers of the same fiber length.

SUMMARY OF THE INVENTION

These and other objects of the invention are obtained by an asbestos product comprising a flexible mat of randomly oriented and interwoven chrysotile asbestos fibers having the appearance of a flake which flake has been flattened and spread out to open the fibers without separation of said flake into individual fibers and without significant reduction in the natural length of the fibers.

DETAILED DESCRIPTION OF THE INVENTION

The asbestos product of the invention can be obtained by subjecting "Coalinga type" asbestos ore to a special milling operation. "Coalinga type" asbestos from which the novel asbestos product of the invention can be obtained may be derived, as aforementioned, from chrysotile ore deposits located in the Coalinga area of California or the Stragari mine in Yugoslovia. These ore deposits frequently contain in excess of 50% chrysotile in contrast to the less than 10% recoverable fiber in the more common cross fiber type ores. The "Coalinga type" chrysotile ore bodies generally lie at or near the surface and are easily traced visually by outcrops or bulldozer cuts. The shallow ore is oxidized, however, to an average depth of about 15 feet to 20 feet. Oxidized ore is discolored and brittle due to the effects of weathering, and as such, cannot be adapted to the customary, normal uses of asbestos. Once this layer is stripped, the ore consists of soft friable masses of chrysotile surrounding fragments of serpentine. The ore is quite uniform, highly sheared and pulverized allowing mining to be carried out by bulldozers and/or scrapers and little else.

From wet-rock storage, the ore passes through a sizing screen designed to remove most of the serpentine particles and is then conveyed to a rotary dryer. The dry asbestos ore, which has the appearance of flakes but is actually flexible mats of randomly oriented and interwoven chrysotile asbestos fibers, is normally subjected to a milling operation, accomplished by the use of vibrating screens and disc grinders, which separates the asbestos into individual fibers. The individual fibers are then collected in an air separator and bagged. Unfortunately, the "Coalinga type" asbestos fiber obtained in this manner is relegated, in view of the relatively poor strength characteristic imposed by the shortness of its fibers, to a Group 7 rating (Quebec Grading System). The Group 7 rating of course severely limits the uses to which these asbestos fibers can be put and as consequence, brings a low market price.

It has now been found that an asbestos product can be obtained from the short-fiber containing "Coalinga type" asbestos ore which satisfies the objects of the invention and has better than a Group 7 rating, for instance is comparable to a Group 6, Group 5 or even Group 4. As aformentioned, the asbestos product of the invention may be obtained by subjecting the "Coalinga type" ores, (i.e. a flexible mat or randomly oriented and interwoven chrysotile fibers having the appearance of a flake) to a "special milling" operation. In accordance with the present invention instead of subjecting the asbestos flakes to a fiberizing operation, that is, a milling which separates the individual fibers, the asbestos flakes or mats are flattened and spread out to merely "open" the fibers without significantly reducing the natural length of the fibers contained therein and without separating the asbestos flakes into individual fibers. In other words, it has been surprisingly discovered that "opening" the "Coalinga type" asbestos but retaining the basic or natural unitary structure of the flakes and preserving the length of the fibers results in an asbestos product having unexpectedly higher strength than asbestos fibers conventionally obtained, when tested, for instance, in asbestos cement composition. Hence, for all practical purposes flakes treated pursuant to the present invention are acting like long fibers and enable use of the product as a Grade 6, 5 and even 4 asbestos. Heretofore, asbestos obtained from Coalinga ore has not had this capability. This means that for the first time asbestos derived from Coalinga type asbestos ore can be used for asbestos cement products such as asbestos cement sheets, pipes and other molded products; paper products such as pipe insulation, wrappings and the like including brake linings and gaskets; vinyl sheet backings and millboard in addition to the usual Group 7 products.

The special milling by which the opening of the "Coalinga Type" asbestos flake is effected without separating or shortening of the fibers can be carried out using various grinding or milling machines such as but not limited to Waring Blenders, fiberizers such as Bauer Fiberizers, Cowles Dispersers, hydropulpers and rod milling machines. Either dry milling (i.e. applying mechanical action to effect opening under dry conditions), wet milling (i.e. applying mechanical action to effect opening in a wet medium such as water) using these or equivalent machines or a combination of both dry and wet milling machines will produce the novel product of the present invention provided that the process is stopped short of significant fiber separation or excessive reduction in the natural length of the fiber. The "special milling" time will vary depending primarily upon the particular grinding or milling machine employed, its grinding efficiency and whether the milling is a dry or wet milling. In all instances, however, the milling is conducted for a time sufficient to flatten and spread out the flakes to open the fibers contained therein but for a time insufficient to effect separation of the flakes into individual asbestos fibers and reduction in the natural length of the fibers.

By way of example, when a Waring Blender is used the opening time with dry milling varies from about 2 to 5 minutes and with wet milling from about 15 seconds to one minute. On the other hand, when a rod mill is used to effect the opening, an opening time of 12 to 18 minutes, preferably about 15 minutes for either wet or dry milling is usually employed. A hydropulper, such as the Barracuda*pulper (*a trademark of Beloit Corporation), requires opening times of about 2 to 6 minutes, preferably 2–4 minutes. The total opening time with conventional fiberizers with grinder plates set at 0.1 inch apart and the material passed through twice will generally fall in the range of 30 seconds to one minute.

Regardless of which machine or process (i.e. wet or dry) is used for the "opening" of the flake pursuant to the invention, it is essential that the milling be stopped short of the normal milling operation otherwise separation of fiber from the flake will occur together with excessive shortening of fiber resulting in an asbestos product of relatively poor strength. With the exception of the rod mill which appears to give a superior performance, most of aforementioned machines produce a comparable opening action. The optimum milling or opening time for any given machine is easily determined by a simple routine investigation.

The preferred "opening" operation comprises first subjecting the raw asbestos flakes to the action of a fiberizer to semi-open the flakes and then completing the opening by subjecting the semi-opened flakes to rod milling, wet or dry.

The "opened" asbestos product of the present invention, when tested as a reinforcing agent in Portland cement at a concentration of 12½% by weight, exhibit a modulus of rupture ($MR_A$) in excess of 270 kg/cm$^2$, often in excess of 350 kg/cm$^2$. In contrast "Coalinga type" asbestos conventionally milled exhibit a modulus of rupture ($MR_A$) when similarly tested as reinforcing agents in Portland cement of less than 190 kg/cm$^2$.

The size of the "opened" flake of the invention will vary but generally falls in the range of +4 to −200 mesh (Tyler) with at least 50% being smaller than 40 mesh provided that no greater than 5% is smaller than −200 mesh.

The asbestos flakes of the invention will most likely find their greatest use as reinforcing agents for binders such as cement and normally solid, synthetic plastic materials. In these compositions the asbestos flake is added to the cement or plastic material in reinforcing amounts, that is, amounts sufficient to reinforce same and generally these amounts fall in the range of 5–25% by weight depending principally upon the particular use to which the composite is to be put. For example, the proportion is by weight for flat or corrugated asbestos cement sheets, 11 to 14% for pressure pipes and 20 to 30% by weight for fire resistant boards. The preferred cement is Portland cement and the preferred plastic materials are polyolefins such as polyethylene and polypropylene; polyvinylhalides such as polyvinylchroides and the like.

Any of the conventional methods for preparing cement and plastic materials can be used. These methods include the Hatscheks process, the Mazza process, the Magni process and the Manville process, all described in *Fibre Cements and Fibre Concretes*, D. J. Hannant, J. Wiley and Sons, 1978.

The following examples are included to further illustrate the present invention.

EXAMPLE I

A sample of raw asbestos fiber obtained from the asbestos ore in the Coalinga, California area and composed of matted chrysotile fibers in the form of asbestos flakes was wet rod milled under varying grinding times to "open" the flakes without separating or reducing the length of the fibers. The resulting asbestos flakes were then subjected to the asbestos-cement evaluation test.

Rod milling was done in a 25 cm × 19 cm diameter mill with a 5 kg rod charge and a speed of 64 rpm. Pulp density was 15% using 20 g of fibre in saturated lime-gypsum water. Grinding times of 0, 5, 10, 15, 20, 25 and 30 minutes were used.

The asbestos-cement relative strength test was run on each batch of the treated fibre using 12.5% by weight fibre concentration unground, i.e. raw, fibre was also tested.

The resulting asbestos-cement properties are summarized in Table I.

TABLE I

| Wet Rod Milling Time (min) | Asbestos-Cement Properties | | | | | |
|---|---|---|---|---|---|---|
| | Drainage Rate (ml/s) | Water Retention (%) | Average Thickness (mm) | Average Load (lb) | Average Density (g/cm$^3$) | Modulus of Rupture (kg/cm$^2$) |
| 0 | 7.7 | 14.6 | 5.60 | 80 | 1.61 | 149 |
| 5 | 3.2 | 24.0 | 6.05 | 200 | 1.64 | 309 |
| 10 | 2.3 | 31.3 | 6.26 | 206 | 1.66 | 289 |
| 15 | 2.9 | 32.8 | 6.39 | 198 | 1.61 | 282 |
| 20 | 3.0 | 33.6 | 6.38 | 172 | 1.66 | 213 |
| 25 | 2.9 | 27.8 | 6.11 | 198 | 1.64 | 299 |
| 30 | 2.4 | 41.9 | 6.68 | 216 | 1.66 | 304 |

(1 1g/cm$^2$ = 0.098 MPa)

The data shows that the wet rod milled asbestos flakes exhibited an average Modulus of Rupture of 286 kg/cm$^2$, which is equivalent to a standard Quebec 6D fiber.

EXAMPLE II

The raw asbestos fiber flake of Example I was subjected to conventional dry rod-milling in a 25 cm × 19 cm diameter mill with a 5 kg rod charge and a speed of 64 rpm. The milling time was 10 minutes.

The resulting flake was subjected to the asbestos-cement relative strength test using 12½% fiber concentration and exhibits an average modulus of rupture of 270.5 kg/cm$^2$, a 6D.

EXAMPLE III

A sample of the raw asbesto fiber flakes of Example I and four fiberized samples were evaluated in the asbestor-cement test using 12½% by weight fiber concentration. The samples were labeled FEED, #1, #2, #3 and #4. The FEED sample and #2 fiberized sample were also subjected to rod milling and the resulting "opened" flakes each subjected to asbestos-cement test.

The fiberized samples #1–#4 had been prepared by running the raw asbestos flake through a Bauer Fiberizer which is a double disk grinding machine whose distance between disks is adjustable to a thousandth of an inch. The settings used to prepared each of the fiberized samples were as follows:

| Sample | Passes** | Setting* |
|---|---|---|
| #1 | Full Double | .005 |
| #2 | Full Double | .100 |
| #3 | Single | .005 |
| #4 | Single | .100 |

*in the thousandths of an inch
**number of passes through the machine

The #2 fiberized sample was subjected to a rod milling stage before the strength test using either a 15 minute wet milling or 7½ minute dry milling plus 7½ minute wet milling.

Rod milling and strength tests were also carried out in the feed sample using either a 15 minute wet milling, 15 minute dry milling or 7½ minute dry milling plus 7½ minute wet milling.

In all instances the rod milling was done in a 25 cm × 19 cm diameter mill with a 5 kg rod charge, 20 g. of fiber and a speed of 64 rpm. For wet milling, a pulp density of 15% in lime-gypsum water was used.

The results are summarized in Table II.

TABLE II

| Sample | Grind | Drainage Rate (ml/s) | Water Retention (%) | Average Thickness (mm) | Average Load (lb) | Average Density (g/cm³) | Modulus of Rupture (kg/cm²) |
|---|---|---|---|---|---|---|---|
| #1 Fibrized | As-received | 6.26 | 20.1 | 5.89 | 111 | 1.59 | 191 |
| #2 Fibrized | As-received | 5.50 | 22.0 | 6.07 | 130 | 1.54 | 223 |
| #3 Fibrized | As-received | 6.22 | 22.0 | 6.06 | 120 | 1.56 | 201 |
| #4 Fibrized | As-received | 6.26 | 20.2 | 5.94 | 99 | 1.57 | 172 |
| #2 Fibrized | 15 min. wet | 2.71 | 21.1 | 5.79 | 223 | 1.66 | 367 |
| #2 Fibrized | 7½ min. dry +7½ min. wet | 1.69 | 20.6 | 5.69 | 199 | 1.68 | 330 |
| Feed | 15 min. dry | 2.09 | 18.7 | 5.51 | 186 | 1.72 | 315 |
| **Feed | 7½ min. dry +7½ min. wet | 1.82 | 20.7 | 5.70 | 205 | 1.68 | 340 |
| Feed | 15 min. wet | 2.76 | 24.4 | 6.09 | 195 | 1.62 | 305 |

*Averaged for two plaques per sample
**Averaged for four plaques per sample

The data of Table II show that neither single nor double fiberizing alone provides acceptable "opening" of the flakes for none of the fiberized samples #1, #2, #3, or #4 gave a Modulus of Rupture in excess of 270 kg/cm².

However, when the raw asbestos flakes (FEED) and fiberized sample #2 were rod milled, the Modulus of Rupture ranged from 305 to 367 kg/cm². The highest Modulus of Rupture, 367 kg/cm², was obtained using the combination of first double fiberizing and then wet rod milling for 15 minutes. A Modulus of Rupture of 367 kg/cm² is similar to Quebec grade 4T fiber.

EXAMPLE IV

Samples of raw, matted, chrysotile asbestos flakes were "opened" by subjecting them to the mechanical action of a Waring Blendor under dry conditions. The opening time was varied from 0 to 5 minutes. After each time interval, i.e. at each opening stage, a wet classifier test (Bauer-McNett or T&N Classifier) was carried out. In so doing, an attempt is made to establish the approximate grade of the fiber sample, in addition to characterizing the sample in terms of response to mechanical action. The results are summarized in Table III.

TABLE III
BAUER-McNETT AND T&N CLASSIFIER RESULTS FOR DRY OPENED* ASBESTOS FLAKE

T&N Classifier

| Sample | Opening Time (min) | +7 | +14 | +25 | +50 | +200 | −200 | Approx. Grade |
|---|---|---|---|---|---|---|---|---|
| a | 0 | 23.8 | 67.8 | 1.1 | 0.4 | 1.3 | 5.6 | — |
| b | 2 | 5.4 | 16.9 | 18.3 | 25.8 | 20.5 | 13.1 | 4T |
| c | 3 | 0.1 | 5.8 | 17.6 | 31.8 | 28.0 | 16.7 | 5R |
| d | 4 | 0.3 | 4.1 | 12.5 | 31.4 | 33.0 | 18.7 | 5R** |
| e | 5 | 0.7 | 3.7 | 9.5 | 29.9 | 35.9 | 20.3 | 6D** |

**Low in −200 mesh in comparison with conventional grades

Bauer-McNett

| Sample | Opening Time (min) | +4 | +14 | Acc. +14 | +35 | +200 | −200 | Approx. Grade |
|---|---|---|---|---|---|---|---|---|

TABLE III-continued

| | | | | | | | | |
|---|---|---|---|---|---|---|---|---|
| a | 0 | 19.4 | 65.3 | 84.7 | 2.6 | 2.2 | 10.5 | — |
| b | 2 | 5.5 | 27.9 | 33.4 | 14.3 | 34.8 | 17.5 | 4T |
| c | 5 | 6.8 | 16.4 | 23.4 | 21.1 | 31.1 | 24.7 | 5R+ |

*2.0 gram samples in Waring Blender

As shown in Table III, the tests on the dry "opened" product indicate an approximate grade of 4T to 5R. Furthermore, microscopic examination of the treated asbestos flakes showed that the mechanical action did not accomplish separation of the flakes into individual fibers or fiber bundles.

EXAMPLE V

Samples of raw, matted chrysolite asbestos flakes were wet "opened" by subjecting them to the mechanical action of a Waring Blendor in a wet medium (lime-gypsum water). The opening time was varied from 0 to 90 seconds. After each time interval, i.e. at each opening stage a wet classifier test (Bauer-McNett) was carried out as in Example IV. The results are summarized in Table IV.

TABLE IV

BAUER-McNETT RESULTS FOR THE WET OPENED* ASBESTOS FLAKE

| Sample | Opening Time (sec) | Bauer-McNett (%) | | | | | Approx. Grade |
|---|---|---|---|---|---|---|---|
| | | +4 | +14 | Acc. +14 | +35 | +200 | −200 | |
| 1 | 0 | 19.4 | 65.3 | 84.7 | 2.6 | 2.2 | 10.5 | — |
| 2 | 15 | 7.9 | 43.3 | 51.2 | 12.8 | 11.7 | 24.3 | 4J |
| 3 | 30 | 1.1 | 15.6 | 16.7 | 17.1 | 28.6 | 37.6 | 5R |
| 4 | 45 | 0.0 | 3.1 | 3.1 | 9.8 | 33.7 | 53.4 | 6D |
| 5 | 60 | 0.2 | 3.3 | 3.5 | 9.4 | 33.5 | 53.6 | 6D |
| 6 | 90 | 0.1 | 0.1 | 0.2 | 1.1 | 23.9 | 74.6 | 7M |

*2.0 g samples in 150 ml lime-gypsum H₂O

A comparison between the data of Table IV and Table III show that wet opening is much faster than dry opening, requiring only seconds instead of minutes. The data of Table IV also shows that excessive opening time, e.g. 60 seconds fails to provide an asbestos product having a Quebec grade any better than that exhibited by asbestos flakes subjected to normal milling.

Samples of dry opened and wet opened asbestos flakes from Examples IV and V were evaluated under the asbestos-cement strength test. The results are reported in Table V.

TABLE V

| Sample | Opening | Filtration Rate (ml/sec) | Water Retention (%) | Density (g/cm³) | Breaking Load (lb) | Modulus of Rupture (kg/cm²) | | Approx. Grade |
|---|---|---|---|---|---|---|---|---|
| | | | | | | MR T | MR A | |
| 1 | Dry, 2 minutes in Waring Blender | 5.2 | 18.2 | 1.60 | 178.0 | 292 | 292 | 6D |
| 2 | Dry, 5 minutes in Waring Blender | 5.3 | 19.0 | 1.63 | 187.5 | 314 | 304 | 6D |
| 3 | Wet, (lime-gypsum water) 30 seconds in Waring Blender | 3.1 | 15.7 | 1.75 | 304.0 | 593 | 490 | 4D |

The results of Table V show that after dry opening a reinforcing value equivalent to that of 6D is obtained, although the Bauer-McNett classification indicates a 5R+ grade. The reverse is found for wet opened fiber which produces a reinforcing value equivalent to that of a 4D, in spite of a 5R grading by Bauer-McNett classification.

EXAMPLE VI

Two attempts were made to evaluate the reinforcing characteristic of raw asbestos flake of the Coalinga type in plastics such as High Density Polyethylene (HDP). The first attempt, using unopened fibre was largely unsuccessful because the relatively large flakes did not separate and disperse in the plastic even after 30 minutes' mixing by roller mill.

In the second attempt, fibre was used that had been dry opened for 5 minutes as described in Example IV. The opened flakes dispersed quite well after only 20 minutes' mixing indicating the suitability of the opened flakes for plastic reinforcement.

It is claimed:

1. A method for producing an asbestos product of increased strength comprising subjecting asbestos ore flakes comprised of a flexible mat of randomly oriented and interwoven chrysotile asbestos fibers to a flattening and spreading out operation for a time sufficient to flatten and spread out said flakes so as to open said fibers but for a time insufficient to effect separation of said flakes into individual asbestos fibers and reduction in the natural length of said fibers.

2. A method according to claim 1 wherein the flattening and spreading out operation is a milling.

3. A method according to claim 2 wherein the milling is carried out in a rod mill.

4. A method according to claim 3 wherein the milling is dry rod milling.

5. A method according to claim 3 wherein the milling is wet rod milling.

6. A method according to claim 2 wherein the milling is carried out in a Waring Blender, hydropulper or a machine with similar mechanical action.

7. A method according to claim 2 wherein the milling is carried out by first subjecting said flakes to the action of a fiberizer to semi-open the flakes and then completing the opening of the flakes by subjecting the semi-opened flakes to wet or dry rod milling.

8. An asbestos product comprising a flexible mat of randomly oriented and interwoven chrysotile asbestos fibers having the appearance of a flake, said flake being flattened and spread out to open said fibers without separation of the flake into individual fibers and without significant reduction in the natural length of the fibers.

9. An asbestos product according to claim 8 having a modulus of rupture ($MR_A$), when tested as a reinforcing agent in Portland cement, in excess of 270 kg/cm$^2$.

10. An asbestos product according to claim 8 having a modulus of rupture ($MR_A$), when tested as a reinforcing agent in Portland cement, in excess of 350 kg/cm$^2$.

11. A composition of matter comprising a binder selected from the group consisting of cement and a normally solid synthetic plastic material having incorporated therein reinforcing amounts of the asbestos product of claim 8.

12. A composition of matter according to claim 11 wherein the binder is cement.

13. An article of manufacture according to claim 12 wherein the amount of said asbestos product is about 5 to 25% by weight.

14. An article of manufacture according to claim 11 wherein the binder is a normally solid plastic material.

15. An article of manufacture according to claim 14 wherein the plastic material is polypropylene.

16. An article of manufacture according to claim 12 wherein the cement is Portland cement.

* * * * *